(12) United States Patent
Huang

(10) Patent No.: US 10,822,046 B2
(45) Date of Patent: Nov. 3, 2020

(54) QUICK SWITCH DEVICE FOR TOY VEHICLE

(71) Applicant: UPRIGHT MANUFACTURERS (SHENZHEN) LTD, Shenzhen (CN)

(72) Inventor: Zhong Huang, Shenzhen (CN)

(73) Assignee: UPRIGHT MANUFACTURERS (SHENZHEN) LTD, Shenzhen (CN)

( * ) Notice: Subject to any disclaimer, the term of this patent is extended or adjusted under 35 U.S.C. 154(b) by 352 days.

(21) Appl. No.: 15/898,008

(22) Filed: Feb. 15, 2018

(65) Prior Publication Data

US 2018/0251181 A1 Sep. 6, 2018

Related U.S. Application Data

(60) Provisional application No. 62/614,937, filed on Jan. 8, 2018.

(30) Foreign Application Priority Data

Mar. 3, 2017 (CN) .................... 2017 2 0201941 U

(51) Int. Cl.
| | |
|---|---|
| *B62K 3/00* | (2006.01) |
| *B62K 9/02* | (2006.01) |
| *B62K 15/00* | (2006.01) |
| *B62K 19/18* | (2006.01) |
| *B62K 13/00* | (2006.01) |
| *B62K 19/32* | (2006.01) |
| *B62K 21/12* | (2006.01) |

(52) U.S. Cl.
CPC ............... *B62K 9/02* (2013.01); *B62K 3/002* (2013.01); *B62K 13/00* (2013.01); *B62K 15/006* (2013.01); *B62K 19/18* (2013.01); *B62K 19/32* (2013.01); *B62K 21/12* (2013.01); *B62K 2206/00* (2013.01)

(58) Field of Classification Search
CPC ...... B62K 15/006; B62K 19/18; B62K 19/32; B62K 21/12; B62K 2206/00; B62K 9/02; B62K 13/00; B62K 3/002
USPC ..................................... 280/87.041
See application file for complete search history.

(56) References Cited

U.S. PATENT DOCUMENTS

| | | | | |
|---|---|---|---|---|
| 4,087,106 A | * | 5/1978 | Winchell ............... | B62B 13/12 180/183 |
| 4,540,192 A | * | 9/1985 | Shelton ................. | B62K 3/002 280/220 |

(Continued)

FOREIGN PATENT DOCUMENTS

WO WO-2017199015 A1 * 11/2017 ........... B62K 15/008

*Primary Examiner* — Paul N Dickson
*Assistant Examiner* — Hilary L Johns
(74) *Attorney, Agent, or Firm* — Danton K. Mak

(57) ABSTRACT

A rapidly detachable switch device for children's vehicles, including a handle assembly that selectively effects switching between plural scooter vehicle configurations, from a fixed-spread sporter configuration to a free-swinging flicker configuration, from the flicker configuration to a fixed scooter configuration, and back from the flicker configuration to the sporter configuration by moving a switch lever member between rearwardly lowered and near-vertically raised positions. The various configurations can be selected rapidly, realizing a three-in-one function for vehicles that can be switched by a rider of the vehicle, the lever being pivotally included in a conveniently removable handle lever assembly.

9 Claims, 6 Drawing Sheets

(56) References Cited

U.S. PATENT DOCUMENTS

| | | | | | |
|---|---|---|---|---|---|
| 5,440,948 A * | 8/1995 | Cheng | | B62K 15/006 | |
| | | | | 280/278 | |
| 6,485,039 B1 * | 11/2002 | Ming-Fu | | B62K 3/002 | |
| | | | | 280/282 | |
| 6,554,302 B1 * | 4/2003 | Liu | | B60T 1/04 | |
| | | | | 280/220 | |
| 6,851,694 B2 * | 2/2005 | Feng | | B62K 3/002 | |
| | | | | 280/220 | |
| 6,880,840 B2 * | 4/2005 | Chuang | | B62K 3/002 | |
| | | | | 280/62 | |
| 6,883,814 B2 * | 4/2005 | Chuang | | B62K 3/002 | |
| | | | | 280/62 | |
| 6,908,090 B2 * | 6/2005 | Chuang | | B62K 3/002 | |
| | | | | 280/62 | |
| 6,923,459 B2 * | 8/2005 | Yeo | | B62K 3/002 | |
| | | | | 280/220 | |
| 6,991,242 B2 * | 1/2006 | Teng | | B62K 3/002 | |
| | | | | 280/87.041 | |
| 7,377,528 B1 * | 5/2008 | Xie | | B62K 3/002 | |
| | | | | 280/220 | |
| 7,549,655 B2 * | 6/2009 | Fan | | B62K 5/02 | |
| | | | | 280/87.041 | |
| 8,807,581 B2 * | 8/2014 | Liao | | B62K 19/18 | |
| | | | | 280/87.041 | |
| 2002/0070519 A1 * | 6/2002 | Rappaport | | B62K 3/002 | |
| | | | | 280/87.041 | |
| 2007/0170666 A1 * | 7/2007 | Chen | | B62K 3/002 | |
| | | | | 280/1.181 | |
| 2009/0115160 A1 * | 5/2009 | Chiu | | B62K 3/002 | |
| | | | | 280/278 | |
| 2010/0320717 A1 * | 12/2010 | Huang | | B62K 3/002 | |
| | | | | 280/221 | |
| 2011/0031709 A1 * | 2/2011 | Kim | | B62K 3/002 | |
| | | | | 280/62 | |
| 2011/0089656 A1 * | 4/2011 | Chiu | | B62K 3/002 | |
| | | | | 280/87.041 | |
| 2012/0223502 A1 * | 9/2012 | Chen | | B62K 3/002 | |
| | | | | 280/221 | |
| 2014/0117641 A1 * | 5/2014 | Fan | | B62K 3/002 | |
| | | | | 280/228 | |
| 2016/0152297 A1 * | 6/2016 | Erickson | | B62K 13/04 | |
| | | | | 280/7.14 | |
| 2016/0229485 A1 * | 8/2016 | Hadley | | B62K 5/10 | |
| 2017/0088224 A1 * | 3/2017 | Baron | | B62K 23/06 | |
| 2017/0361892 A1 * | 12/2017 | O'Rourke | | B62K 3/002 | |

* cited by examiner

QUICK SWITCH DEVICE FOR TOY VEHICLE

CROSS-REFERENCE TO RELATED APPLICATIONS

The present Application claims the benefit of U.S. Provisional Patent Application No. 62/614,937 titled "Rapidly Detachable Switch Device for Toy Vehicle" filed Jan. 8, 2018; and claims priority to Chinese Patent Application No. 201720201941.0 titled "A Rapidly Detachable Switch Device for Toy Vehicle," filed Mar. 3, 2017, the contents of which are incorporated in this disclosure by reference in their entirety.

BACKGROUND

The present invention relates to children's toy vehicles, and more particularly to scooter-type vehicles having three wheels and being self-propelled in response to side-to-side rider forces. The swing scooters, frog scooters, and kick scooters of the prior art typically provide only a single operating mode configuration, and those that provide more than one lack a convenient way to switch between configurations.

Thus there is a need for a scooter vehicle that overcomes at least some of the above difficulties and disadvantages of the prior art.

SUMMARY

The present invention meets this need by providing a scooter vehicle that is conveniently convertible between plural operating configurations. In one aspect of the invention, a switch mechanism is provided for a three-wheeled scooter vehicle having a head tube column and a handlebar pair for steering a front wheel, left and right foot assemblies respectively pivotally connected relative to the head tube column, each foot assembly having a castered rear wheel and a foot plate. The switch mechanism includes (a) front extremities of each foot assembly having a vertically oriented tube segment rigidly connected thereto, (b) upper and lower clamp plates for selectively gripping upper and lower extremities of the tube segments, and (c) a pivotally connected clamp lever for selectively urging the clamp plates against the tube segment extremities whereby, (i) in a first position of the clamp lever the foot assemblies are free to pivot laterally relative to the head tube column; and (ii) in a second position of the clamp lever the foot assemblies are each clamped against lateral pivoting relative to the head tube column. Preferably each of the tube segments has a stop boss formed thereon, and a positioning plate is rigidly supported relative to the head tube column, the positioning plate being engaged by the stop bosses to limit pivotal movement of the foot assemblies between: (i) parallel relation in alignment with the head tube assembly; and (ii) spread relation diverging from the parallel relation.

Preferably, the second position of the clamp lever selectively clamps the foot assemblies in parallel relation and in spread relation. Preferably the switch mechanism includes a spring for biasing the upper and lower clamp plates apart from the tube segment extremities when the clamp lever is in its first raised position.

Preferably, at least one of the clamp plates is formed with tooth serrations for enhanced clamping effectiveness against corresponding tube segment extremities. Preferably, extremities of the tube segments facing the tooth serrations are correspondingly serrated, the serrations of the at least one clamp plate engaging the serrations of the tube segments when the clamp lever is in the lowered second position thereof.

Preferably, the clamp lever is formed having a cam surface, and the clamp lever is pivotally connected to a clamp screw, the clamp screw being threadingly engageable relative to one of the clamp plates, the cam surface being coupled to the other of the clamp plates for effecting the clamping when the clamp lever is in the lowered second position thereof. A collar can be interposed between the cam surface of the clamp lever and the other of the clamp plates, for transmitting forces from a cam surface of the lever to the other of the clamp plates.

The switch mechanism can further include a head tube base rigidly connected to the head tube column, the pivotable connections of the foot assemblies being to the head tube base. In addition, each of the tube segments can have a stop boss formed thereon; and a positioning plate can be rigidly connected to the head tube base, the positioning plate being engaged by the stop bosses to limit pivotal movement of the foot assemblies between (i) parallel relation in alignment with the head tube assembly; and (ii) spread relation apart from the parallel relation.

In another aspect of the invention, a three-wheeled vehicle includes (a) a head tube column; (b) a handlebar pair; (c) a front wheel connected to the handlebar pair through the head tube column; (d) left and right foot assemblies respectively pivotally connected relative to the head tube column, each foot assembly having a castered rear wheel and a foot plate; and (e) a switch mechanism including (i) front extremities of each foot assembly having a vertically oriented tube segment rigidly connected thereto and pivotally connected relative to the head tube column; (ii) upper and lower clamp plates for selectively gripping upper and lower extremities of the tube segments; and (iii) a pivotally connected lever for selectively urging the clamp plates against the tube segment extremities whereby, in a first position of the lever the foot assemblies are free to pivot laterally relative to the head tube column, and in a second position of the lever the foot assemblies are each clamped against lateral pivoting relative to the head tube column.

The lever can be included in a handle lever assembly that further includes a lever screw that is pivotally connected to the lever and threadingly engaged with one of the clamp plates for convenient removal. At least one of the clamp plates can be a tooth plate, formed having radial serrations for engaging corresponding serrations of the tube segments.

DRAWINGS

These and other features, aspects, and advantages of the present invention will become better understood with reference to the following description, appended claims, and accompanying drawings, where:

DESCRIPTION

Figure 1:
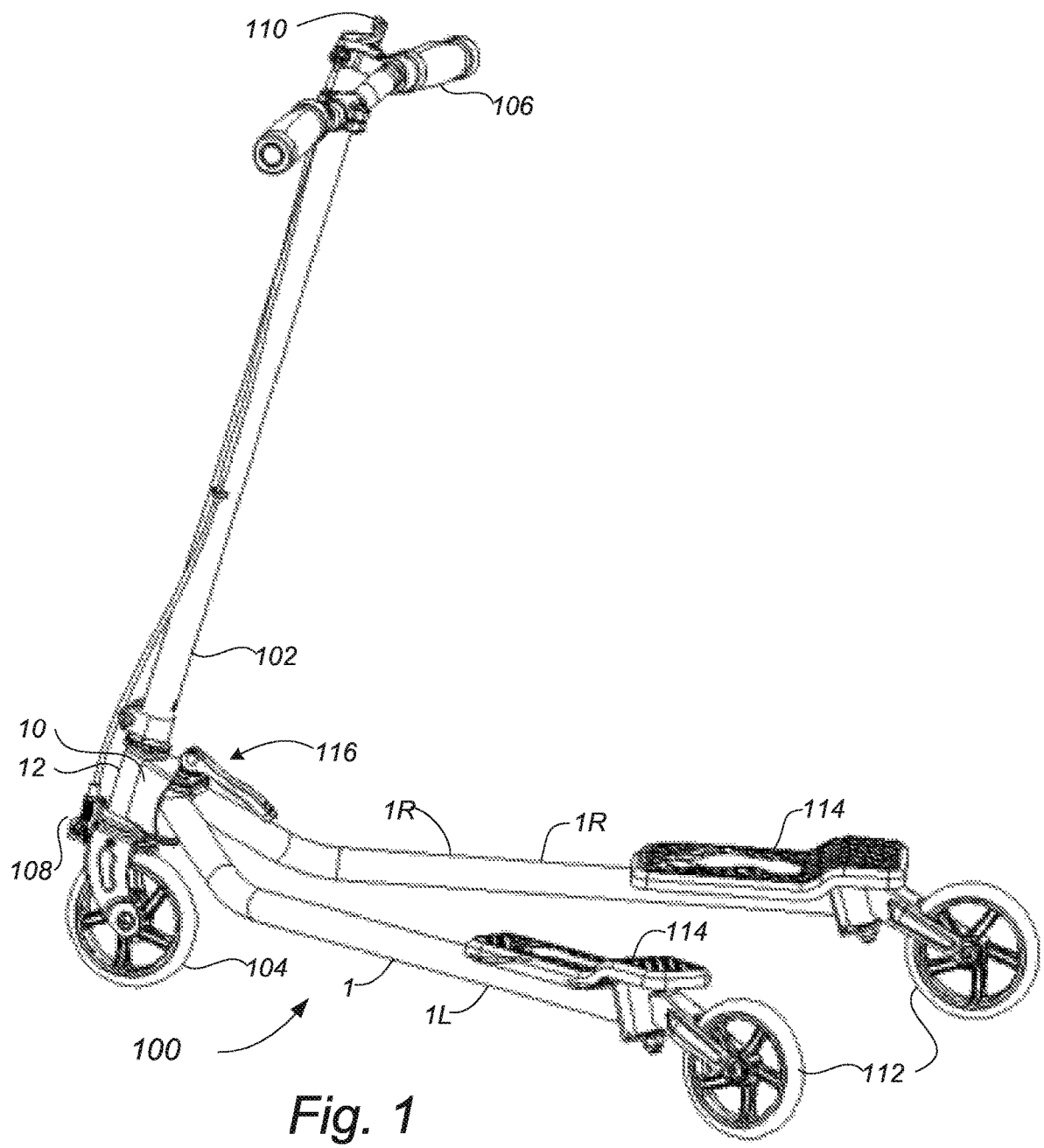
FIG. 1 is an elevational perspective view of a scooter vehicle that is particularly conveniently convertible between plural operating configurations.

The present invention is directed to a scooter vehicle that is particularly easily convertible between operating mode configurations. With reference to FIGS. 1-4 of the drawings, an exemplary scooter vehicle 100 includes a conventional head tube column 102 for steering a front wheel 104, a handlebar pair 106 being rigidly connected at an upper extremity of the column. The front wheel 104 is equipped with a conventional brake mechanism 108 that is operated by a brake lever 110 that is movably mounted on the handlebar pair 106.

Left and right foot tube assemblies 1, respectively designated 1L and 1R, are pivotally connected proximate the front wheel 104 as described herein, each foot tube assembly having a conventionally castered rear wheel 112 and a foot plate 114. Front extremities of the foot tube assemblies 1 are incorporated in a switch mechanism 116 according to the present invention and best shown in FIGS. 3 and 4. The switch mechanism 116 further includes four bearings 2 and shaft sleeves 3, a pair of tooth plates 4 (sometimes referred to as clamp plates), a pivotable handle lever assembly 5, a spring 6, a pair of screws 7 and nuts 8, a positioning plate 9 and a head tube base 10, the positioning plate being optional as further described in connection with FIG. 4, below. The tooth plates are further designated upper tooth plate 4U and lower tooth plate 4L.

Figure 3:
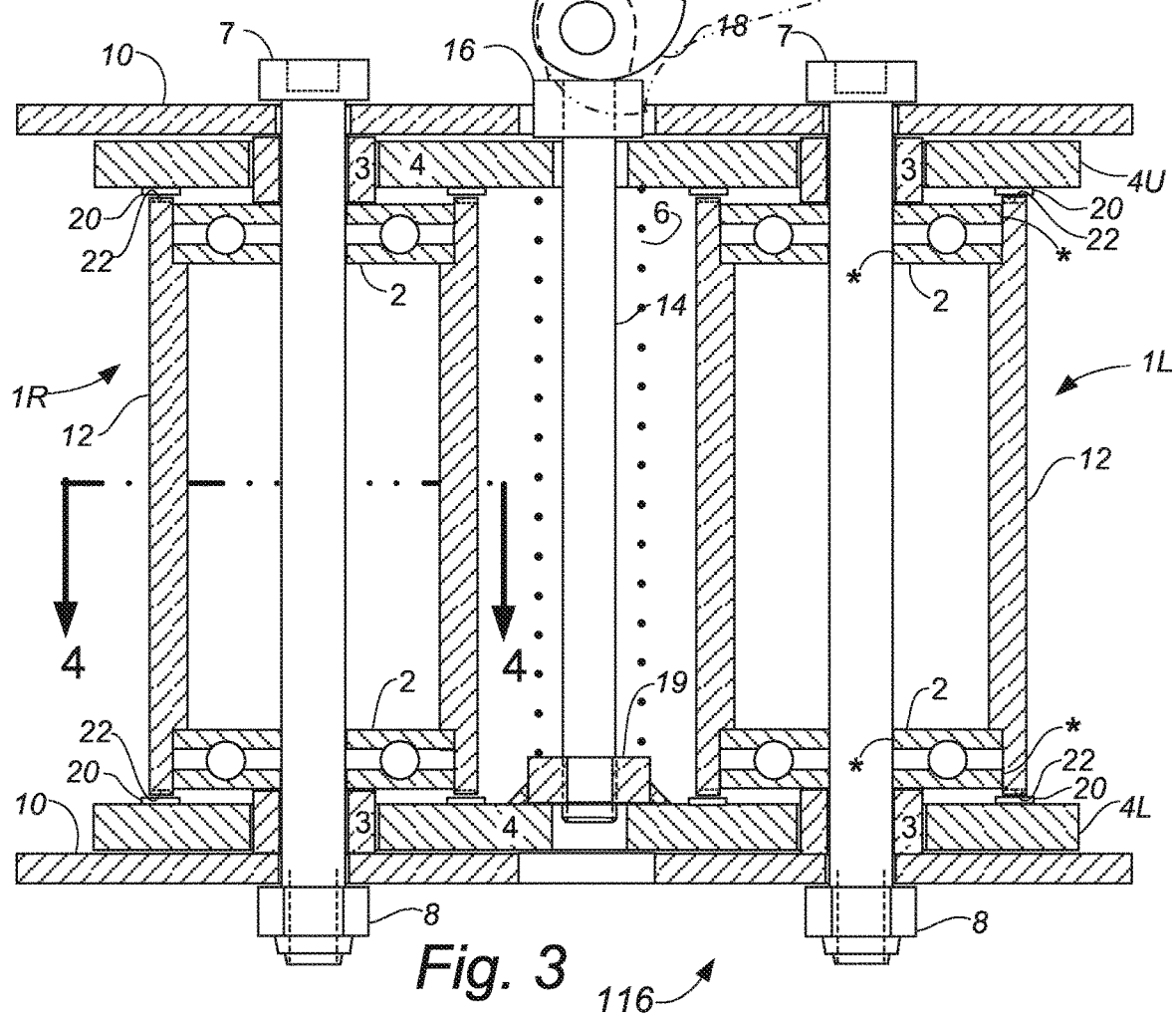
FIG. 3 is a fragmentary sectional elevational view within the switch mechanism.

A vertically oriented tube segment 12 is rigidly connected at the front extremity of each foot tube assembly 1, the bearings 2, the sleeves 3, and the screws and nuts 7 and 8 pivotally connecting the foot tube assemblies 1 to the head tube base 10 according to the present invention as best shown in FIG. 3. More particularly, the handle lever assembly 5 includes a lever member 13 that is pivotally connected to a lever screw 14, the lever screw extending through a collar 16. The lever member 13 has a cam surface 18 that bears against the collar 16, for moving the collar downwardly on the lever screw 14 as the lever member 13 is moved generally downwardly as depicted by the curved arrow in FIG. 3. As further shown in FIG. 3, the lever screw 14 extends through the upper tooth plate 4U, being threadingly coupled to the lower tooth plate 4L by means of a nut 19 that is welded to the lower tooth plate 4L. It will be understood that the lever screw 14 can optionally be configured to directly threadingly engage the lower tooth plate 4L, the nut 19 being omitted.

According to the present invention, when the lever member 13 is moved downwardly as depicted by the curved arrow in FIG. 3, the collar 16 bears against the upper tooth plate 4U and the lever screw 14 pulls the lower tooth plate 4L upwardly, clamping the tube segments 12 of the tube assemblies 1 between the tooth plates 4. As further shown in FIG. 3, the tooth plates 4 are preferably serrated as indicated by dashed lines 20, and upper and lower extremities of the tube segments 12 are preferably also serrated as indicated by dashed lines 22. The serrations are preferably radially oriented for effectively clamping the tube assemblies 1 as desired when the lever member 13 is moved to its downward position, indicated by dashed lines in FIG. 3. When the lever member 13 is returned to its vertical orientation as shown by solid lines in FIG. 3, the spring 6 urges the tooth plates 4 apart, thus releasing the clamping action.

For further clarity, the four bearings 2 are installed respectively in upper and lower cavities of the two tube segments 12 of the foot tube assemblies 1, the four shaft sleeves 3 pressing respectively on the opposite sides of the upper and lower plane bearings 2. One pair of the shaft sleeves 3 projects through round holes at both ends of the upper tooth plate 4U, the other pair of sleeves similarly projecting through the lower tooth plate 4L. The spring 6 is arranged between the two tooth plates, the foot tube assemblies 1 being installed in the head tube base 10, the bottom of the rapidly detachable handle 5 passing through a central hole of the head tube base 10 and through a hole at the center of the upper tooth plate 4U, and the bottom of the rapidly detachable handle assembly being removably locked relative to the lower tooth plate 4L with the lever screw 14.

Figure 2:
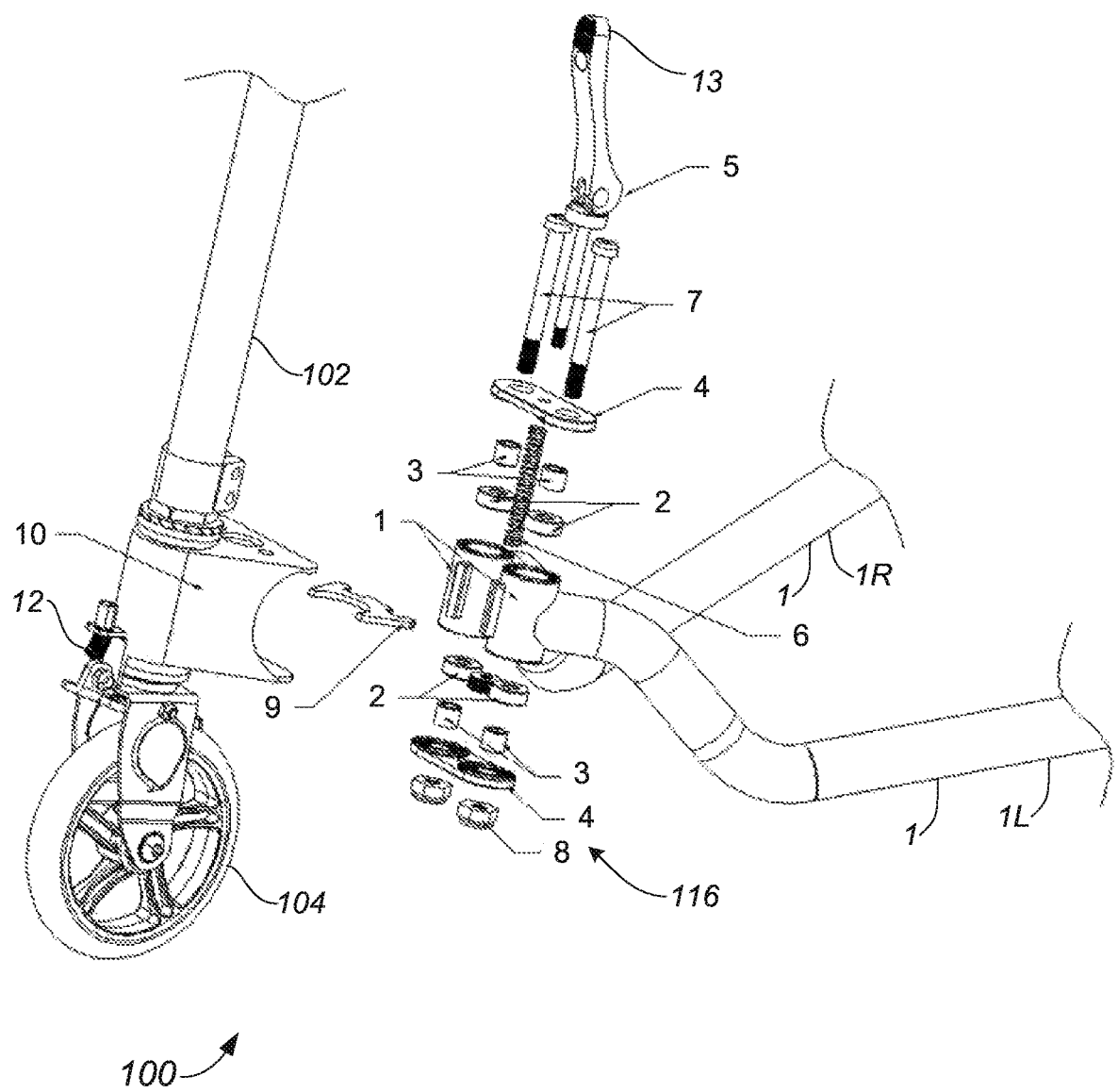
FIG. 2 is an exploded view of a switch mechanism portion of the scooter vehicle.
Figure 4:
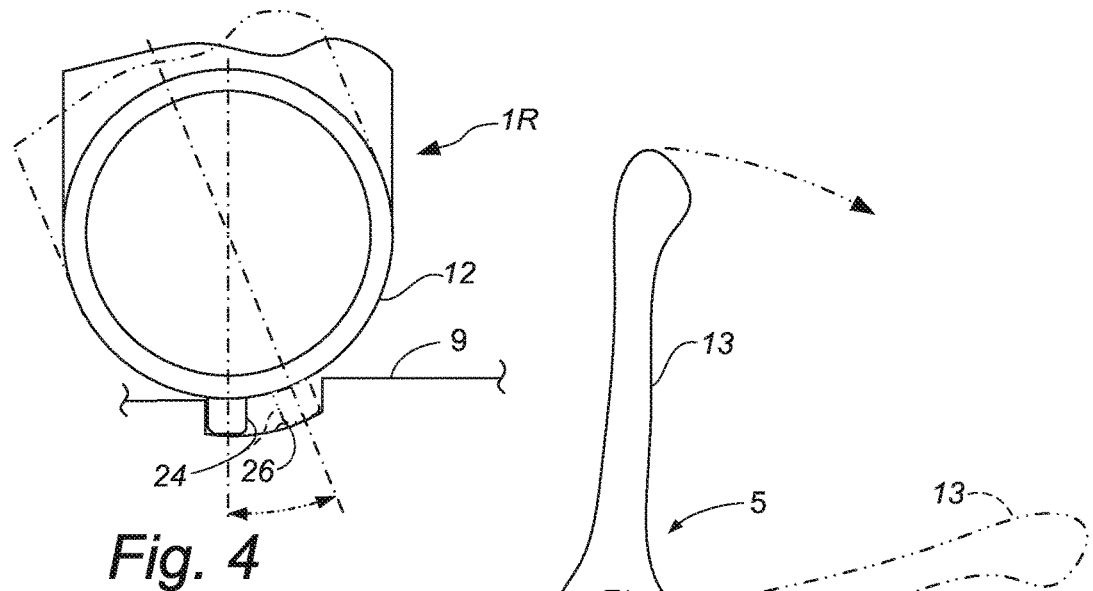
FIG. 4 is a plan detail view showing an optional positioning plate and stop rib feature of the switch mechanism.

With particular reference to FIGS. 2 and 4, the optional positioning plate 9 advantageously limits an angular range of motion of the tube assemblies 1, as shown in connection with the tube assembly 1R. A protrusion in the form of a vertically oriented stop boss 24 is formed on each of the tube segments 12, such as by welding or casting. In this exemplary configuration, the positioning plate 9 is fixedly mounted within the head tube base 10, such as by welding, being relieved by a channel 26 in which the stop boss 24 is free to move as the associated tube assembly can freely swing through a limited range of motion as depicted by the curved arrow in FIG. 4, when the lever member 13 is raised as shown in the solid outline in FIG. 3. It will be understood that other means for limiting the range of angular motion of the tube assemblies 1 are possible, such as by contact with side portions of the tube base 10, and/or a central protrusion extending rearwardly as a part of the tube base 10.

Figure 5:
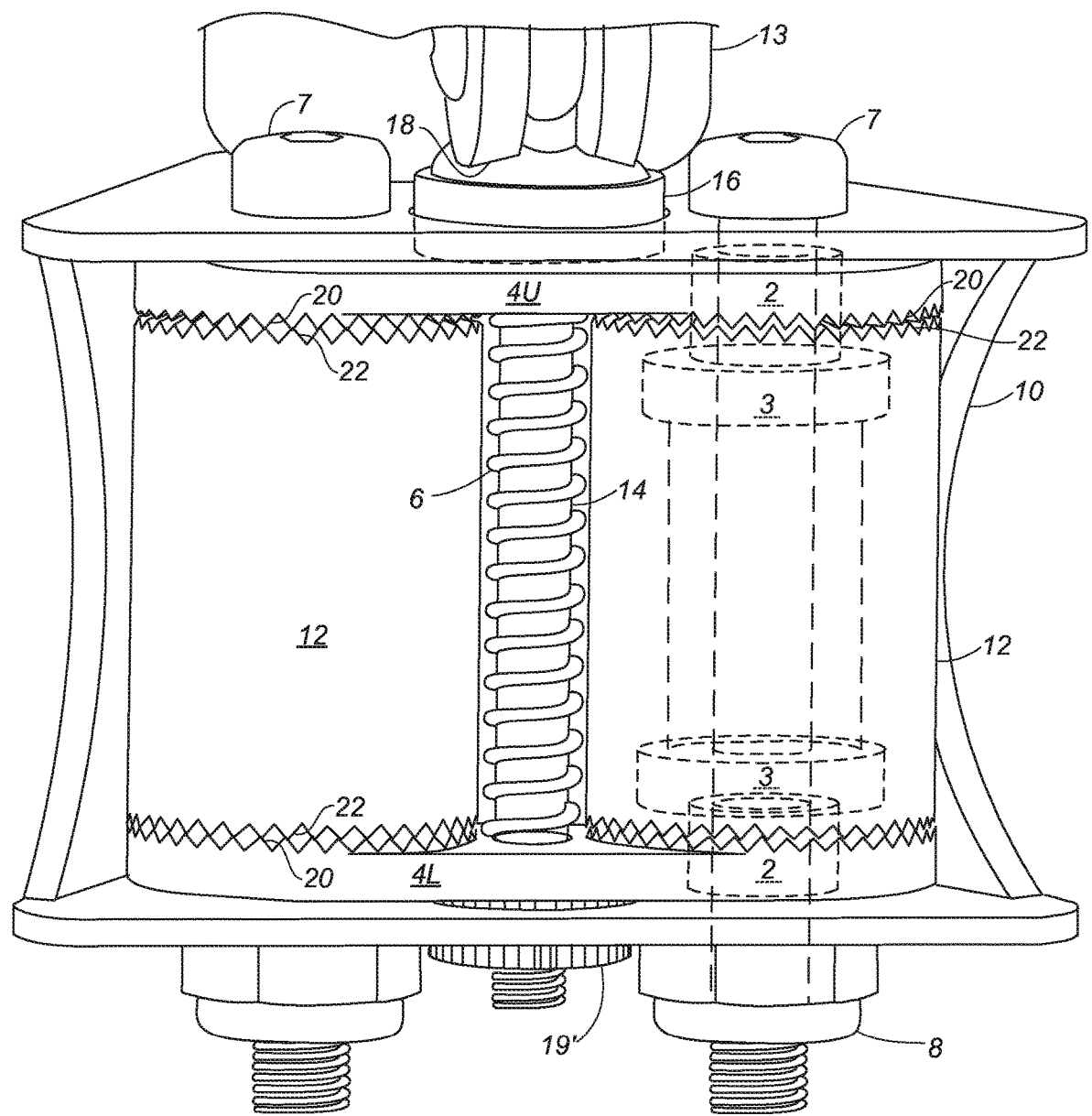
FIG. 5 is an elevational perspective view showing an alternative configuration of the switch mechanism of FIG. 2.

With further reference to FIG. 5, an alternative configuration of the switch mechanism, designated 116', has a counterpart of the nut 19, designated 19', located under the lower tooth plate 4L. In other respects, the switch mechanism 116' corresponds to the switch mechanism 116 of FIGS. 1-4.

Figure 6:
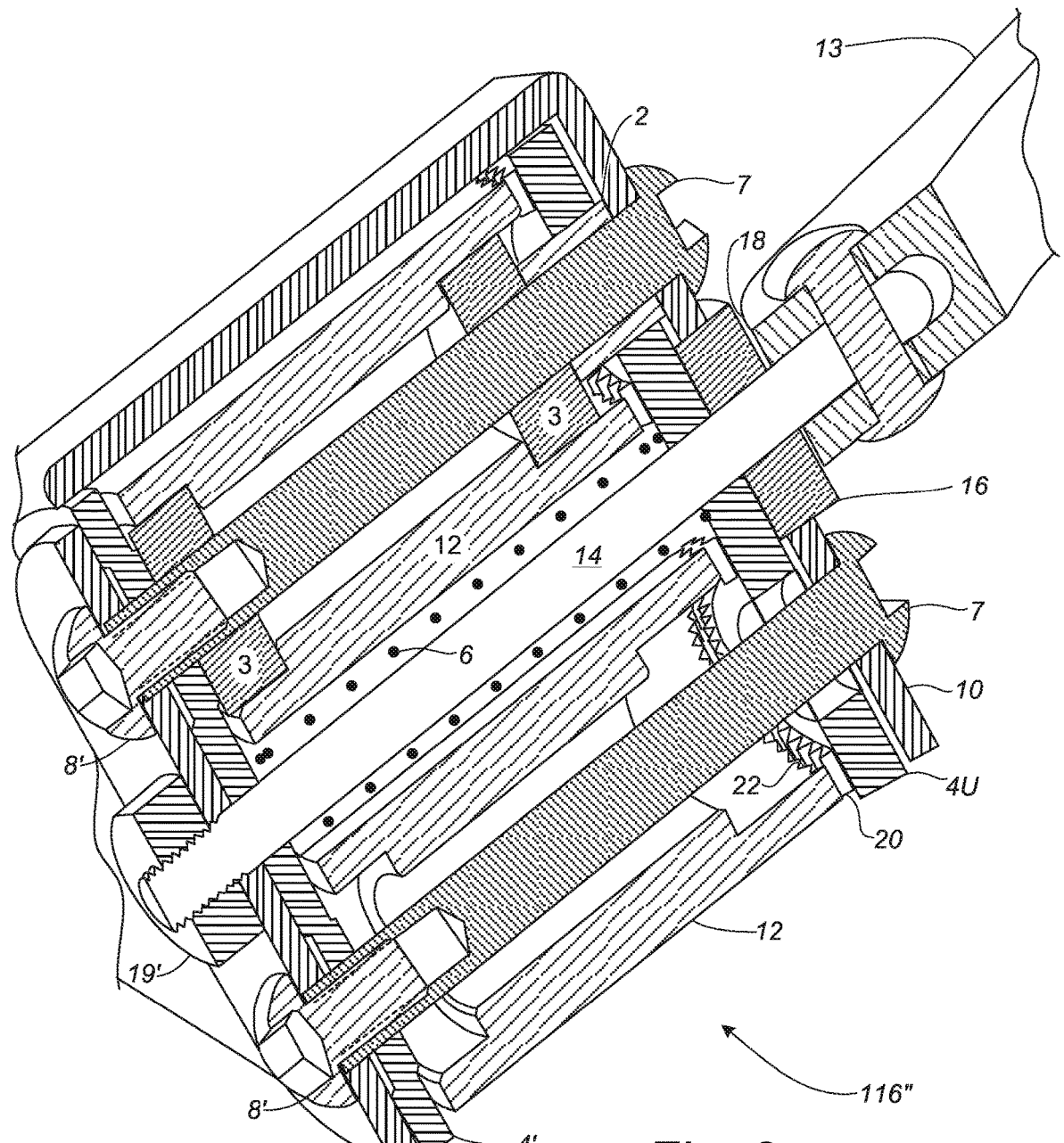
FIG. 6 is a sectional perspective view showing another alternative configuration of the switch mechanism.

With further reference to FIG. 6, another alternative configuration of the switch mechanism, designated 116", includes counterparts of the bearings 2 supported in counterparts of the tube segments as described above, the tube segments being designated 12' because they have counterparts of the serrations 22 on top only, there being a counterpart of the upper tooth plate 4U; in place of the lower tooth plate 4L is a non-toothed counterpart, designated clamp plate 4'. A counterpart of the nut 19' is located under the clamp plate 4'.

Figure 7:
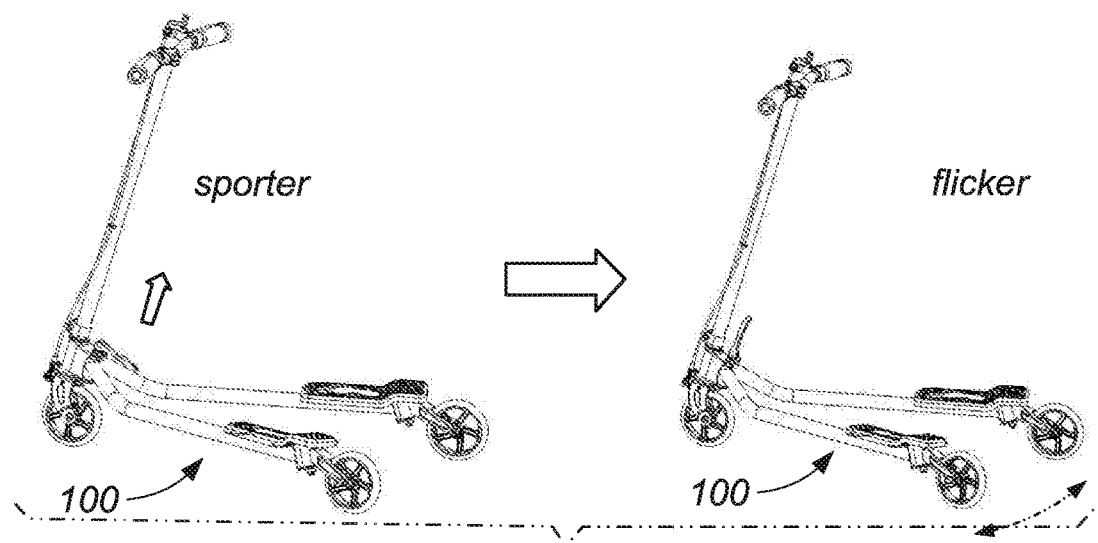
FIG. 7 is an elevational perspective view of the scooter vehicle being changed from a fixed spread sporter configuration to a freely swinging flicker configuration.
Figure 8:
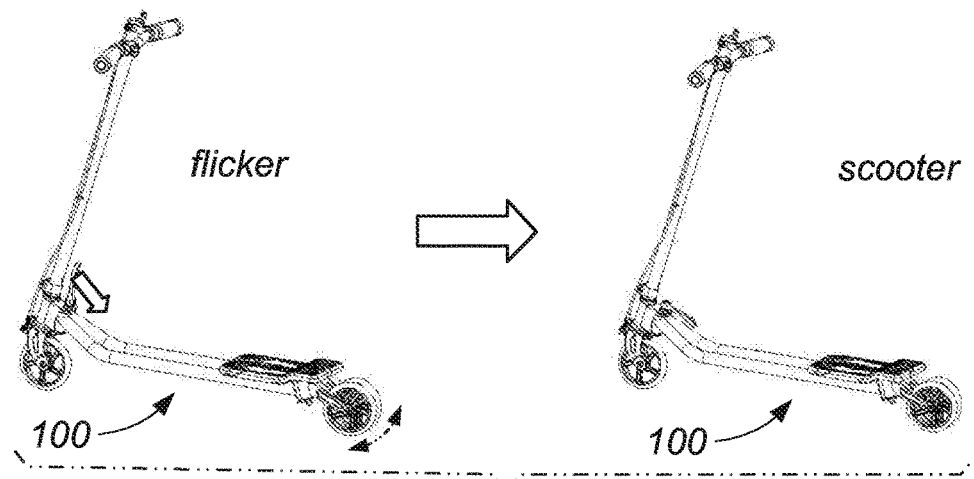
FIG. 8 is an elevational perspective view as in FIG. 6, showing the scooter vehicle being changed from the flicker configuration to a fixed scooter configuration.
Figure 9:
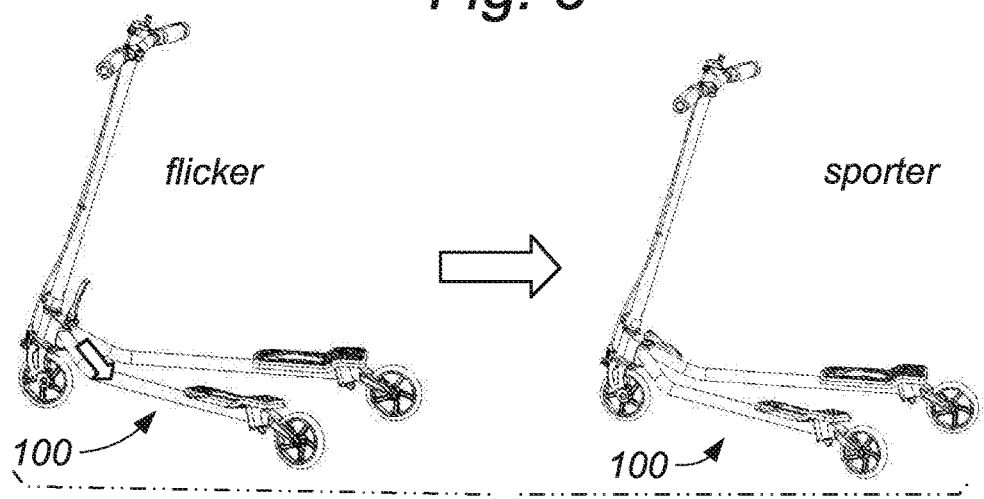
FIG. 9 is an elevational perspective view as in FIGS. 6 and 7, showing the scooter vehicle being changed from the fixed scooter configuration to a spread apart fixed sporter configuration.

With further reference to FIGS. 7-9, convenient switching between the various configurations of the scooter vehicle is made possible by the incorporation of the handle lever assembly 5 and the tooth plates 4 that selectively engages the respective teeth or serrations 20 and 22 of the tooth plates 4 with the tube segments 12. FIG. 7 shows the scooter vehicle 100 being switched from a fixed-spread sporter configuration to a free-swinging flicker configuration by movement of the lever member 13 from its lower, rearwardly extending position to its raised, nearly vertical configuration. It will be understood that this can be accomplished, perhaps with a little practice, by a user while riding on the scooter vehicle 100. Similarly, FIG. 8 shows the scooter vehicle 100 being switched from the flicker configuration to a fixed scooter configuration by lowering the lever member 13 rearwardly after first bringing the tube assemblies together. FIG. 9 shows the scooter vehicle 100 being switched back from the flicker configuration to the sporter configuration by lowering the lever member rearwardly after first spreading the tube assemblies 1. In each case, it is believed that these configuration changes can be advantageously effected by a user while riding on the scooter 100.

Although the present invention has been described in considerable detail with reference to certain preferred versions thereof, other versions are possible. For example, the bearings 3 can be plain bearings formed of a low-friction material such as Nylon or Delrin, or they can be antifriction ball or roller bearings, ball thrust bearings being shown in FIG. 3. (When using ball thrust bearings it is preferred to avoid tight fitting at locations identified by asterisks (*) in FIG. 3. Therefore, the spirit and scope of the appended claims should not necessarily be limited to the description of the preferred versions contained herein.

What is claimed is:

1. A switch mechanism for a three-wheeled scooter vehicle having a head tube column and a handlebar pair for steering a front wheel, left and right foot assemblies respectively pivotally connected relative to the head tube column, each foot assembly having a castered rear wheel and a foot plate, the switch mechanism comprising:
   (a) front extremities of each foot assembly having a vertically oriented tube segment rigidly connected thereto, and each tube segment having a stop boss formed thereon, upper and lower clamp plates for selectively gripping upper and lower extremities of the tube segments, and a pivotally connected clamp lever for selectively urging the clamp plates against the tube segment extremities whereby,
      (i) in a first position of the clamp lever the foot assemblies are free to pivot laterally relative to the head tube column; and
      (ii) in a second position of the clamp lever the foot assemblies are each clamped against lateral pivoting relative to the head tube column; and
   (b) a positioning plate rigidly supported relative to the head tube column, the positioning plate being engaged by the stop bosses to limit pivotal movement of the foot assemblies between:
      (i) parallel relation in alignment with the head tube assembly; and
      (ii) spread relation diverging from the parallel relation.

2. The switch mechanism of claim 1, further comprising a spring for biasing the upper and lower clamp plates apart from the tube segment extremities.

3. The switch mechanism of claim 1, wherein at least one of the clamp plates is formed with tooth serrations for enhanced clamping effectiveness against the tube segment extremities.

4. The switch mechanism of claim 3, wherein extremities of the tube segments facing the tooth serrations are correspondingly serrated, the serrations of the at least one clamp plate engaging the serrations of the tube segments when the clamp lever is in the second position thereof.

5. The switch mechanism of claim 1, wherein the clamp lever formed having a cam surface, the clamp lever being pivotally connected to a clamp screw, the clamp screw being threadingly engageable relative to one of the clamp plates, the cam surface being coupled to the other of the clamp plates for effecting the clamping when the clamp lever is in the second position thereof.

6. The switch mechanism of claim 5, further comprising a collar interposed between the cam surface of the clamp lever and the other of the clamp plates.

7. The switch mechanism of claim 1, further comprising a head tube base rigidly connected to the head tube column, the pivotable connections of the foot assemblies being to the head tube base.

8. A three-wheeled vehicle comprising:
   (a) a head tube column;
   (b) a handlebar pair;
   (c) a front wheel connected to the handlebar pair through the head tube column;
   (d) left and right foot assemblies respectively pivotally connected relative to the head tube column, each foot assembly having a castered rear wheel and a foot plate; and
   (e) a switch mechanism comprising:
      (i) front extremities of each foot assembly having a vertically oriented tube segment rigidly connected thereto and pivotally connected relative to the head tube column;
      (ii) upper and lower clamp plates for selectively gripping upper and lower extremities of the tube segments; and
      (iii) a pivotally connected lever for selectively urging the clamp plates against the tube segment extremities whereby, in a first position of the lever the foot assemblies are free to pivot laterally relative to the head tube column, and in a second position of the lever the foot assemblies are each clamped against lateral pivoting relative to the head tube column;
         wherein the lever is included in a handle lever assembly that further comprises a lever screw, the lever screw being pivotally connected to the lever and threadingly engaged with one of the clamp plates for convenient removal.

9. The three-wheeled vehicle of claim 8, wherein at least one of the clamp plates is a tooth plate, formed having radial serrations for engaging corresponding serrations of the tube segments.

* * * * *